W. F. KIESEL, Jr.
CAR BRAKE.
APPLICATION FILED JULY 2, 1914.
1,162,242.
Patented Nov. 30, 1915.
2 SHEETS—SHEET 1.
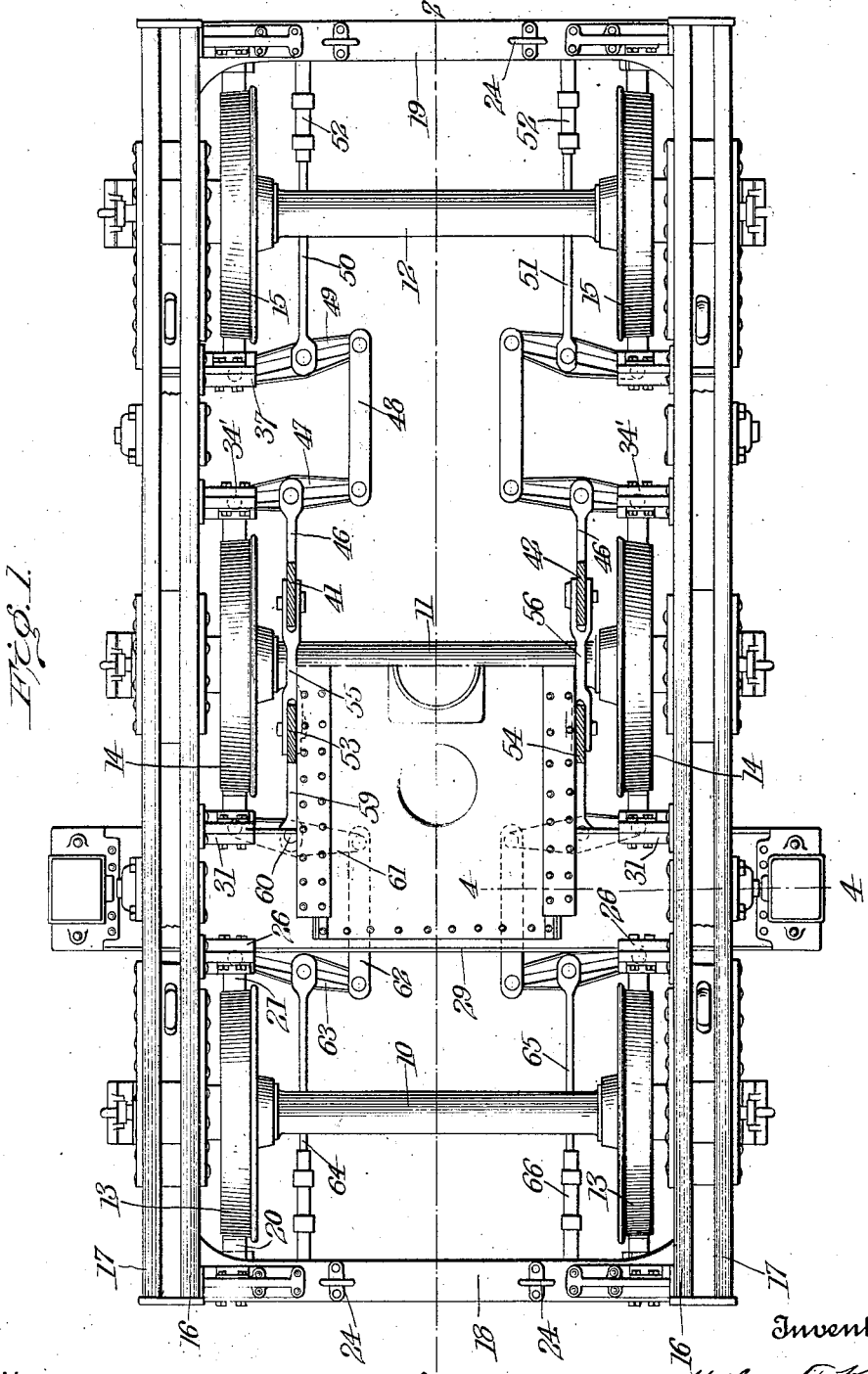

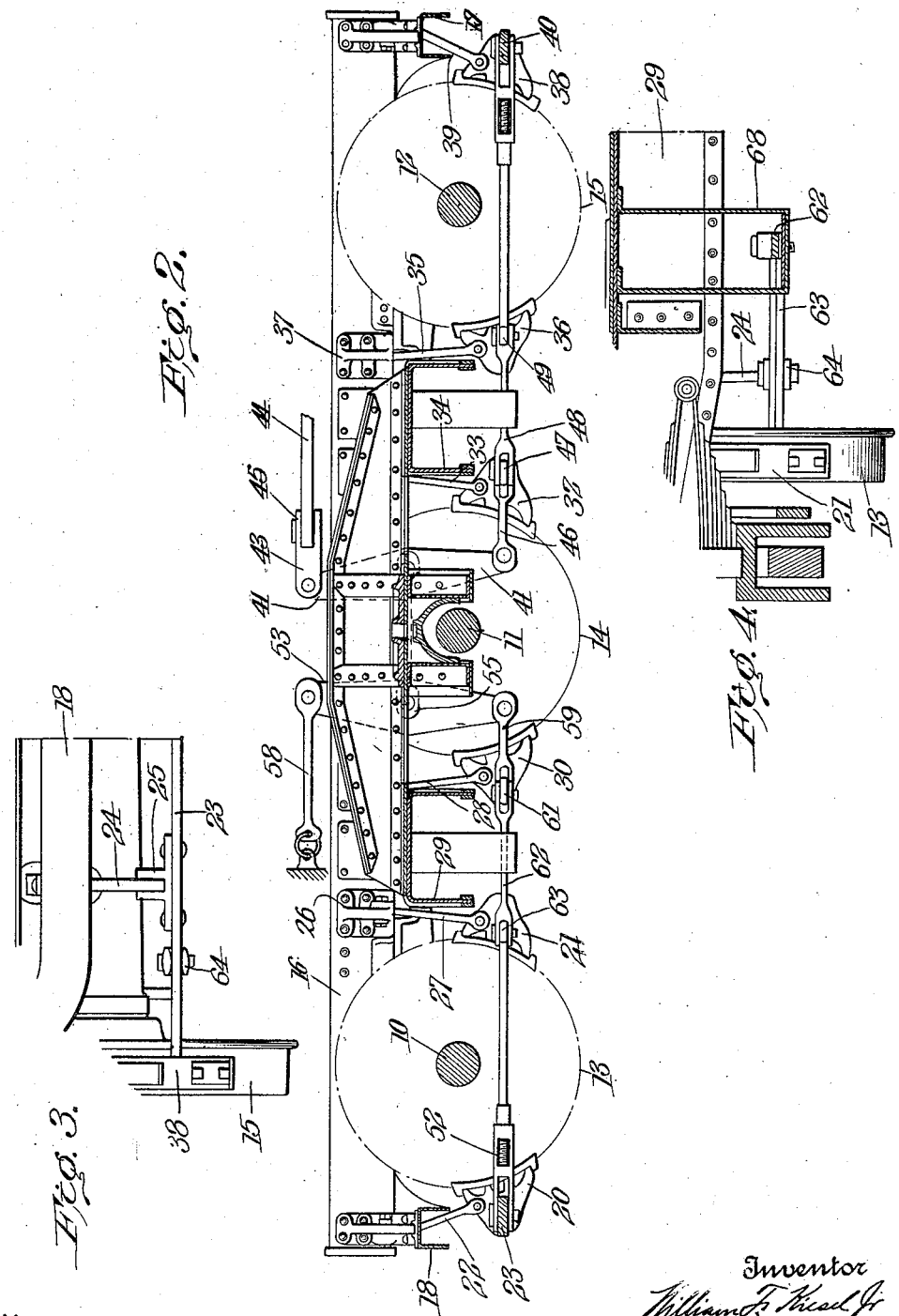

UNITED STATES PATENT OFFICE.

WILLIAM F. KIESEL, JR., OF ALTOONA, PENNSYLVANIA.

CAR-BRAKE.

1,162,242.  Specification of Letters Patent.  Patented Nov. 30, 1915.

Application filed July 2, 1914. Serial No. 848,615.

*To all whom it may concern:*

Be it known that I, WILLIAM F. KIESEL, Jr., a citizen of the United States, and resident of Altoona, county of Blair, State of Pennsylvania, have invented certain new and useful Improvements in Car-Brakes, of which the following is a specification.

My invention relates to car brakes generally and more particularly to a clasp brake arrangement for six-wheel trucks.

It is the principal object of my invention to arrange a brake on the truck so that it will practically consist of four units, two on each side of the transverse center line through the center plate of the truck. Each unit includes three brake heads. The advantage of this arrangement is that it provides better means for equalizing and less angularity for brake levers. Excessive distortion of the brake levers is objectionable when shoe wear takes place.

A further object is to locate the live and dead primary levers as near to the transverse center line through the truck pivot as is possible and to apply the general scheme shown in my Patent No. 1,092,917 of April 14, 1914, to six-wheel truck construction.

The above and other objects and the novel feature of my invention will be apparent from the following description taken in connection with the drawings, in which, Figure 1 is a plan view of a six-wheel truck embodying my invention; Fig. 2 is a longitudinal sectional view taken on the line 2—2 of Fig. 1 looking in the direction of the arrows; and Figs. 3 and 4 are views of details.

Referring to the drawing a truck has the three axles 10, 11 and 12 upon the ends of which are fixed the pairs of wheels 13, 14 and 15. Outside the wheels on the ends of the axles are mounted the side frames which comprise two similar channel bars 16 and 17 having the channels thereof disposed opposite to each other and the beams are bolted together to form a rigid construction and at their ends the side frame members made up of the two beams are secured together by the end frame members 18 and 19. Suitable pedestals are provided for supporting the side frame members on the axles.

The brake devices on each side of the truck are alike and I will therefore describe the braking devices on one side of the truck only, it being understood that the same description applies to the opposite side.

Brake heads 20 and 21 carry brake shoes which engage the tread of the wheel 13 on opposite sides of the axle 10. The brake head 20 is suspended from the end transverse frame member 18 by means of a link 22 and the brake head 20 is also fastened to the end of a brake beam 23 whereby the brake beam 23, which extends across the end of the truck, hangs from the hanger rods 22 depending from the frame on opposite sides of the truck. Safety hangers are provided in the form of links 24 hung from the transverse frame member 18 and attached to the brake beam by a lug 25. These links are placed on opposite sides of the longitudinal center line of the truck and are longer than necessary to hold up the brake beam and do not become effective until some supporting part for the brake beam breaks, in which case links 24 prevent the beams from falling to the track.

The brake head 21 is hung by means of a link 27 from a bracket 26 riveted to the side frame member 16 and a similar link 28 on the opposite side of the bolster 29 suspends the brake head 30 from the bracket 31. The shoe carried by the brake head 30 engages the tread of the center wheel 14 and on the opposite side of the axle 11 of the wheel 14 there is a similar brake head 32, the shoe on which engages the tread of the wheel 14.

The brake head 32 is hung by means of the link 33 from a bracket 34' riveted to the side frame member 16. On the opposite side of the bolster 34 there is a similar link 35 which suspends the brake head 36 from a bracket 37 riveted to the side frame member 16.

The shoe on the brake head 36 is capable of engaging the tread of the wheel 15 and on the opposite side of the axle 12 there is a similar brake head 38, the shoe of which also engages the tread of the wheel 15. The brake head 38 is similar in all respects to the brake head 20 being hung from the end transverse frame member 19 by means of the link 39. The brake head 38 is also mounted at the end of the brake beam 40 which beam is suspended from the transverse frame member 19 by means of the hanger link 39 and a flexible chain connects each side of the brake beam to the member 19 in a similar manner to the chain link 24 and attaching lug 25. On opposite sides of the longitudinal center line of the truck and adjacent the transverse center line of the truck through the center plate there are two live primary brake levers 41 and 42. The upper end of each of the brake levers 41 and 42 is flexibly connected by a link 43 and brake rod 44 to an equalizing lever not shown, which is located near the brake operating devices at some convenient place on the car. The link 43 and rod 44 are flexibly connected together by a swivel connection 45.

The connections of the levers 41 and 42 to the brake heads are in all respects similar and only the connection of the lever 41 will be described. The lower end of the lever 41 is pivotally connected by the link 46 to a point intermediate the ends of a secondary brake lever 47 which is horizontally disposed, while the lever 41 is disposed in a vertical plane. The outside end of the secondary brake lever 47 is pivotally connected to the brake head 32 while the inside end of the lever 47 is connected by means of a link 48 to the inner end of a third or tertiary brake lever 49. The outside end of the brake lever 49 is pivotally connected to the brake head 36. Intermediate the ends of the brake lever 49 it is pivotally connected to a rod 50 which extends rearwardly and parallel to a rod 51 on the opposite side of the center line of the truck. The rods 50 and 51 are pivotally connected to the brake beam 40 on opposite sides of the center line of the truck and are each provided with suitable means 52 to adjust the effective length of the rods. Intermediate their ends the primary live levers 41 and 42 are respectively connected to the primary dead levers 53 and 54 by means of the equalizing bars 55 and 56. The primary levers 41, 42 and 53, 54, are located on opposite sides of the center axle 11 and the equalizing bars 55 and 56 extend across the transverse center line through the truck pivot. The primary levers are located as nearly as possible to the transverse center line through the truck pivot and are disposed in the same plane.

The upper end of each of the primary dead levers 53 and 54 is pivotally anchored by a rod 58 to a part of the truck or it may be anchored to brackets or other devices of the car body which are located near the transverse center line of the truck pivot in a manner similar to the construction shown in my patent hereinbefore referred to.

The connection of each dead lever to its group of brake heads is in all respects similar and therefore only one set of connections will be described. At its lower end the dead lever 53 is pivotally connected by a rod 59 to a point 60 intermediate the ends of the horizontally disposed secondary brake lever 61. The outer end of the secondary brake lever 61 is pivotally connected to the brake head 30 and the inner end is connected by means of a link 62 to the inner end of a horizontally disposed tertiary brake lever 63. The outer end of the brake lever 63 is pivotally connected to the brake head 21 and intermediate its ends it is connected to the end of a rod 64, the other end of the said rod being pivotally connected to the brake beam 23 and being disposed substantially parallel to the rod 65 on the opposite side of the longitudinal center line of the truck. The rod 65 is connected in a similar manner to the brake beam 23 and both rods 64 and 65 have devices 66 whereby the length thereof may be adjusted.

The links 48 and 62 and the corresponding links on the opposite side of the longitudinal center line of the truck pass through box brackets 68 secured to the under side of the transom whereby the inner ends of the secondary and tertiary brake levers are suitably supported.

It will be seen from the foregoing description that the brake on each truck consists of practically four units, each unit comprising three brake heads connected to a primary brake lever through a secondary and tertiary brake lever. Each primary brake lever is located substantially on the transverse center line of the truck through the truck pivot, the end brake heads being connected together and serving in a degree to equalize the braking effort. The main equalization of the braking effort is obtained by a primary equalizing lever located at any suitable point on the car.

Numerous changes may be made in the details of construction without departing from the spirit of the invention and therefore I do not wish to be limited to the exact devices shown and described.

Having described my invention what I claim and desire to secure by Letters Patent is, 1. In a brake for six-wheel car trucks, the combination of three axles, a wheel on each of said axles and located on the same side of the truck, a primary brake lever located on each side of the center axle, brake heads on opposite sides of each wheel and arranged three in a group on each side of the center axle, and a horizontally disposed actuating member connected with each brake head and with a primary lever.

2. In a brake for six-wheel car trucks, the combination of three axles, a wheel on each of said axles and located on the same side of the truck, a primary brake lever located on each side of the center axle, brake heads on opposite sides of each wheel and arranged three in a group on each side of the center axle, and means connecting each group of brake heads with a primary brake lever comprising a secondary and a tertiary brake lever, each pivotally connected with a brake head.

3. In a brake for six-wheel car trucks, the combination of three axles, a wheel on each of said axles and located on the same side of the truck, a primary brake lever located on each side of the center axle, brake heads on opposite sides of each wheel and arranged three in a group on each side of the center axle, comprising a secondary brake lever carrying a brake head for the center wheel, a link pivotally connecting said secondary lever with a primary lever, a tertiary lever carrying a brake head for the inner side of an end wheel, a link connecting the oppositely disposed ends of the secondary and tertiary levers, and a rod pivoted to the tertiary lever and connected to the brake head for the outer side of an end wheel.

4. In a brake for six-wheel car trucks, the combination of three axles, wheels near the ends of each of said axles, primary brake levers located substantially on the transverse center line of the truck through the truck pivot, brake heads on opposite sides of each wheel, brake beams connecting the brake heads on the outer sides of the end wheels, and means connecting brake beams, the brake heads carried thereby and the remaining brake heads on the same side of the center axle with said primary levers comprising secondary and tertiary levers and connecting links.

5. In a car truck, the combination of three axles, wheels fixed on said axles, side frame members mounted on said axles, a bolster member between the center axle and each end axle, brake heads on opposite sides of each wheel, means extending between said bolster members and the adjacent wheels for supporting the brake heads for the center wheels and for the inner sides of the end wheels, and primary brake devices located substantially on the transverse center line of the truck through its pivot and connected to actuate said brake heads.

6. In a brake for six-wheel car trucks, the combination of three axles, wheels near the ends of each of said axles, and braking means for said wheels comprising four units, two units on each side of the transverse center line of the truck, each unit comprising a group of three brake heads, and an operating member for each brake head.

7. In a brake for six-wheel car trucks, the combination of three axles, wheels near the ends of each of said axles, and braking means for said wheels comprising four units, two units on each side of the transverse center line of the truck, each unit comprising a group of three brake heads, an operating member for each brake head, a pair of live primary truck levers, one at each side of the truck near the transverse center line, a pair of dead brake levers, one at each side of the truck near the transverse center line thereof, and means for connecting said live and dead levers together in pairs and to the operating members on the same side of the truck therewith.

8. In a brake for six-wheel car trucks, the combination of three axles, wheels near the ends of each of said axles, and braking means for said wheels comprising four units, two units being located on each side of the transverse center line of the truck, each unit comprising a group of three brake heads, and brake means at the ends of the truck and connecting the brake heads on opposite sides of the truck and serving to equalize the effect of the braking means on opposite sides of the truck.

9. In a brake for six-wheel car trucks, the combination of three axles, wheels near the ends of each of said axles, and braking means for said wheels comprising four units, two units on each side of the transverse center line of the truck, each unit comprising a group of three brake heads, horizontally disposed secondary and tertiary brake levers for operating the brake heads associated with the center wheel and inside of the end wheel respectively, means for supporting the outer brake head in position, rods connecting said levers and supporting means together and a primary lever located near the transverse center line of the truck for operating the unit.

10. In a car truck, the combination with a truck having a plurality of axles and wheels on said axles, of a pair of primary brake levers one on each side of the truck, brake heads associated with the wheels, horizontally disposed brake levers for operating the inner brake heads, means connecting the primary levers with the horizontal levers, and brake means carrying the outer brake heads and connected to the horizontal brake levers.

In testimony whereof I affix my signature in presence of two witnesses.

WILLIAM F. KIESEL, Jr.

Witnesses:
J. C. STORM,
H. A. HOKE.